United States Patent [19]
Pontuti et al.

[11] Patent Number: 5,906,696
[45] Date of Patent: May 25, 1999

[54] MINIMUM VISIBILITY SEAM TAPE AND METHOD OF JOINING SUBSTRATES USING THE SAME

[75] Inventors: James A. Pontuti, Westminster, Md.; Robert W. Warner, Woodbury, Minn.; Richard F. Theissen; John A. Nielsen, both of St. Paul, Minn.

[73] Assignee: Minnesota Mining and Manufacturing Company, St. Paul, Minn.

[21] Appl. No.: 08/099,220

[22] Filed: Jul. 29, 1993

Related U.S. Application Data

[62] Division of application No. 07/688,648, Apr. 19, 1991, Pat. No. 5,260,113.

[51] Int. Cl.$^6$ ..................................................... B32B 35/00
[52] U.S. Cl. .................................. 156/98; 40/603; 40/604; 156/304.3; 156/304.4; 428/61; 428/63
[58] Field of Search .................................... 156/304.3, 98, 156/304.4; 428/61, 63, 247; 40/603, 604

[56] References Cited

U.S. PATENT DOCUMENTS

| | | |
|---|---|---|
| 941,047 | 11/1909 | Shelton ...................................... 428/63 |
| 2,243,506 | 5/1941 | Mitchell . |
| 3,523,856 | 8/1970 | Yaeger . |
| 3,664,907 | 5/1972 | Price . |
| 3,703,779 | 11/1972 | Goldman . |
| 3,734,795 | 5/1973 | Griffith ....................................... 156/98 |
| 3,968,275 | 7/1976 | Dees, Jr. et al. . |
| 4,047,994 | 9/1977 | Komatsu . |
| 4,242,380 | 12/1980 | Courtoy . |
| 4,244,769 | 1/1981 | Tracy . |
| 4,590,027 | 5/1986 | Murphy et al. . |
| 4,682,433 | 7/1987 | Stilling ...................................... 40/615 |
| 4,885,820 | 12/1989 | Erceg et al. . |

FOREIGN PATENT DOCUMENTS

| | | |
|---|---|---|
| 0 235 432 A2 | 9/1987 | European Pat. Off. . |
| 0 235 432 A3 | 9/1988 | European Pat. Off. . |
| 61-58724 | 8/1986 | Japan . |
| 1244833 | 9/1989 | Japan . |
| WO 84/04486 | 11/1984 | WIPO . |

*Primary Examiner*—John J. Gallagher
*Attorney, Agent, or Firm*—Gary L. Griswold; John H. Hornickel

[57] ABSTRACT

A minimum visibility seam tape and method of joining at least two substrates with the tape. The substrates joined typically are sign faces or awnings comprising a composite of thermoplastics and a woven scrim. The seam tape is a woven or nonwoven scrim embedded in or coated with a thermoplastic polymer.

7 Claims, No Drawings

MINIMUM VISIBILITY SEAM TAPE AND METHOD OF JOINING SUBSTRATES USING THE SAME

This is a division of application Ser. No. 07/688,648 filed Apr. 19, 1991, now U.S. Pat. No. 5,260,113.

BACKGROUND OF THE INVENTION

1. Field of the Invention

The invention relates to a seam tape and method of joining at least two substrates with the tape to provide a seam having minimum visibility. The substrates joined are typically sign faces or awnings comprising a composite of plastics and a woven scrim. The seam tape is a woven or nonwoven scrim embedded in a thermoplastic.

2. Description of the Related Art

Signs, awnings, canopies, fascia and banners (hereinafter referred to as signs) are utilized in applications requiring a strong, flexible, weather-resistant material. These signs are used indoors and outdoors and are secured to a frame such that the sign is stretched across the frame. The signs often have various color schemes and graphics emblazoned on them. The colors and graphics can be corporate logos, corporate color patterns, etc. These signs often are rendered visible from a source of backlighting which can either be natural or artificial light. The construction of the sign substrate generally involves a woven scrim sandwiched between layers of polymeric materials such as thermoplastics. The scrims are laminated to a thermoplastic such as polyvinyl chloride, polyester or polyurethane. There are various patents which describe such sign materials, including U.S. Pat. Nos. 3,523,856, 3,968,275, 4,590,027, and 4,242,380. However, one problem which has existed to date is that there is not an adequate material or method to seam these laminates without the seam area being visibly obvious to the viewer. To date, seamed laminates have utilized seam tape with a woven scrim which was very visible in the seamed laminate, thus resulting in a visible seam.

There are numerous reasons for seaming laminates. One commercially-significant reason is to adjoin smaller laminates to create large signs. There is often a need for a sign that is larger than the presently-available sign faces. Therefore, the laminates need to be pieced together to create a larger sign. Another reason to seam is that often the scrim has a visible defect produced during the weaving process. Other defects include oil, dirt, and insects which may become pressed into the laminate during the heating process. These defects are currently removed from the laminate by removing a strip of material that contains the defect. This process reduces the size of the laminate, which leads to the necessity of seaming the laminate to another section of laminate.

The seam must be strong such that the seamed laminate can withstand environmental conditions, i.e., wind, rain, heat, humidity, etc. The seam also must have minimal visibility. A seam which is visible is magnified when the sign is backlit. The seam often shows up as a dark stripe, which is undesirable from an aesthetic point of view. Furthermore, signs often carry logos and colorful graphics in which visible seams can often detract significantly from the visual impact of the intended message.

To date, the above-identified problems involving the seaming of signs have not been adequately addressed. It has now been discovered that the problems of seam strength and seam visibility can be minimized through the use of a unique seam tape which adjoins sign substrates.

SUMMARY OF THE INVENTION

In accordance with the invention, there is provided a sign face construction and a method of making the sign face construction utilizing a minimally-visible seam tape. The sign face construction is as follows:

At least two sheets of sign face material, each sheet comprising a composite of layers with a first and third layer comprising a sign thermoplastic and a second scrim layer positioned between the first and third layer, are positioned such that an edge of each sheet is in an abutting relationship, thereby defining an abutting region. A seam tape extends substantially the length of said abutting region and contacts each of the sheet edges. The seam tape comprises at least a two-layer construction of a woven or nonwoven seam scrim having a relatively open fiber pattern and layer of a thermoplastic material coated thereon. The open fiber pattern of the seam scrim allows each of the fibers to be substantially wetted by the thermoplastic material in which the fibers are embedded when the tape is heated under pressure.

One method of using the scrim tape to make a sign face construction comprises the steps of:

(a) providing at least two sheets of sign face material, the sheets each comprising a composite of layers with a first and third layer of a sign thermoplastic material and a second scrim layer positioned between the first and third layer;

(b) aligning the two sheets such that an edge of each sheet is in an adjoining position and defines an adjoining region;

(c) positioning the seam tape in the adjoining region such that a portion of the tape contacts each sheet, the tape comprising at least a two-layer construction of a nonwoven or woven seam scrim having a first layer of scrim thermoplastic polymer coated therein, the seam scrim capable of being substantially wetted out by the scrim thermoplastic polymer;

(d) heating the adjoining region to a temperature which exceeds the melting temperature of the scrim thermoplastic polymer;

(e) exerting sufficient pressure to the heated region to substantially wet the seam scrim with said polymer; and (f) allowing the adjoining region to cool, resulting in a minimally visible seam.

The seam tape of the present invention may also be used to secure replacement patches in sign material which have had imperfections removed, as described hereinafter.

DETAILED DESCRIPTION OF THE INVENTION

It has been found that the seam tape of the present invention may be used to join two sections of sign face material to form a strong, integral sign face with a minimally visible seam. The term "minimally visible" is meant to denote a seam which is not optically objectionable to the naked eye at normal viewing distances. More specifically, individual scrim fibers are not visible to the naked eye.

This is accomplished in the present invention by (1) selecting scrim materials and thermoplastic matrix polymers which have similar indices of refraction, and are the same color or are transparent, and (2) arranging the scrim fibers in an open relation so that under heat and pressure the thermoplastic matrix polymer will flow around and intimately wet and encapsulate the fibers displacing substantially all of the air in the tape. Due to the similar refractive indices of the scrim fibers and the matrix polymer and the absence of air, the fibers become substantially invisible in the matrix, resulting in a relatively invisible seam area.

In addition, the seam area can be further rendered unobtrusive by choosing matrix polymers, scrim materials, and light-absorbing dyes, pigments, etc., so that the apparent color is similar to the sheets to be joined, and the apparent optical density of the seam region is within about ±50% of the region surrounding the seam, preferably within ±25% of the apparent optical density of the region surrounding the seam.

The thermoplastic and scrim materials should also be chosen to be chemically compatible with each other and with the sign materials to be joined. The matrix polymers should adhere well to the sign face materials and should be relatively stable in the environment in which it will be used. Many such materials are available and known to those skilled in the art as described hereinafter.

The seam tape of the present invention may also be used as a patch material. There are often imperfections in the sign face material which can simply be punched out by a die to create an aperture. A replacement patch of the same sign face material is then cut out and positioned in the punched-out aperture. A seam tape patch of the present invention is then cut to a dimension that is bigger than the replacement patch, and placed over the replacement patch. Heat and pressure are applied to the seam tape region, thereby resulting in a patched region having minimum visibility.

The substrates which are secured together by the minimally-visible seam tape to form a seam can be any durable and flexible dimensionally-stable material to which the seam tape will adhere with the application of heat and pressure. The substrates are often a composite of different polymeric materials. Various polyvinyl chloride sheet constructions are currently widely used in the sign face industry. A preferred sign face material is a substrate comprising a polyester woven scrim embedded between two layers of polyvinyl chloride, commercially available under the trade designation "PANAFLEX," available from 3M Company, St. Paul, Minn.

The seaming tape is comprised of a monofilament, loose multifilament, woven, or non-woven scrim. The scrim may be polyester, polyamide, polypropylene, polyethylene, polyurethane, mixes of thermoplastics, or other acceptable scrim materials. Preferably, the scrim is a nonwoven polyester material.

The scrim can vary in size and denier. The strength and wetability of the scrim is the critical feature. The strength should be matched to the application's demands, such as indoor, outdoor, etc. The wetability is related to the openness of the fibers forming the scrim. If the fibers are tightly packed or twisted, it is difficult for the fibers to substantially wet out. This results in trapped air between the fibers which absorbs light and creates a dark visible line. Complete wetting results in a substantially-transparent fiber, thus a minimally-visible seam. A preferred scrim is a nonwoven polyester having a unit weight of 50 gms/m$^2$, commercially available from Reemay Inc.

The scrim is coated with, or pressed into a thermoplastic polymer which has been cast, extruded, calendered, or laminated using other laminating processes. The index of refraction of the thermoplastic should be similar to the scrim index of refraction. Possible thermoplastics include polyester, polyamide, polyimide, polyurethane, polyurea, polypropylene, polyethylene, polycarbonate, and other extrudable thermoplastics. A preferred thermoplastic is a plastisol of polyvinyl chloride. A combination of two or more thermoplastics may also be employed. Typically, the thermoplastic is present on the scrim at a weight range of about 0.4 gms/cm$^2$. The preferred weight range of thermoplastic coating on the scrim is in the range of about 0.2–1.0 gms/cm$^2$. The thermoplastic may be coated on one side or both sides of the scrim. An alternative embodiment includes the addition of an adhesive on the seam tape. In the preferred embodiment, the scrim is embedded into a gelled thermoplastic polymer and the material is heat-laminated until the thermoplastic has flowed partially through the scrim. The scrim is wetted out and forms an optically-uniform seam in the the final seamed laminate construction.

The seaming tape may be a variety of widths, but it has been found that a width of about 0.8–3.0 centimeters provides adequate strength to the seamed sign face. Generally, a strip of seaming tape is cut the length of the seam. The substrates are positioned in an adjoining relationship to form an adjoining region, such that there is no gap between the substrates. A strip of seam tape is laid over the adjoining region such that approximately one half the width of the seam tape is positioned over each substrate. A heat sealer is then applied to the adjoining region, applying both heat and pressure to the region which secures the seam tape to each substrate, thus creating a seam. As discussed above, the temperature needs to be above the softening or melting temperature of the thermoplastic polymer of the seam tape. The pressure applied should be sufficient to ensure that the heated thermoplastic flows into the substrate matrix, thus securing the seaming tape to the substrate. Typical pressures are in the range of about 20 to 1000 KPa.

EXAMPLES

The following examples, in which all parts are by weight unless otherwise indicated, illustrate various embodiments of the minimally-visible seam tape of the present invention. The examples are exemplary only and are not intended to be limiting.

Samples were prepared and the resulting seam was tested for its strength.

SEAM VISIBILITY TEST

In the following test, sign faces were secured together using the seam tape and method of the present invention and of the prior art. The sign faces were prepared in accordance with the following examples resulting in a seamed construction. The seams were then measured for their optical density and light transmission. Samples of each "PANAFLEX" substrate and the area where the seaming tape joined the two individual pieces of "PANAFLEX" were measured for optical density (OD). The instruments used for these measurements were either a Macbeth Densitometer TR-524 or a TR-927. The procedure used to measure the OD was ANSI Std. ASC PH 2.18-1984. A conversion table was used to translate the OD measurements to percent transmission. The percent transmission for the "PANAFLEX" substrate averages 25.60 for the total number of samples measured. The measurement of the seamed areas ranged from a low of 8.128 (the seam currently produced in production), up to 31.62% transmission.

SEAM STRENGTH TESTING

The material to be tested were samples of sign face materials that had been seamed together.

A 2.54 cm wide sample was cut perpendicular to the direction of the seam. The sample was cut such that it was 10 cm in length from each side of the middle of the seam. This sample was placed into an Instron Tensile Strength Tester. The jaw separation used was 5 cm and the sample was positioned so that the center of the seam was in the middle of the jaw opening. The jaw speed was set at 30.50 cm/minute.

Example 1

Components used in the manufacturing of the seam tape of the present examples include a nonwoven nylon scrim, available under the trade designation "Cerex Product Type 23" (1 oz./sq.yd.) commercially available from James River Corporation, a casting liner available under the trade designation "AW Liner," commercially available from S. D. Warren Company, and a clear plastisol of polyvinyl chloride, which is a homopolymer and blending resin of polyvinyl chloride dispersed in a monomeric phthalate plasticizer. The plastisol is available under the trade designation "DX 2385" and is commercially available from Plastomeric, Inc. The clear plastisol was coated on the casting liner at a weight of 0.4 gms/cm$^2$ and gelled in an oven at a temperature of 95 degrees C. The scrim was laminated into this gelled plastisol using a hotcan and pressure. The temperature of the hotcan was 150 degrees C. and the pressure at the nip was 280 KPa. The material was moved continuously and the composite was exposed to the pressure and temperature for a total of 2.5 minutes. The material was then stripped from the casting liner and slit into rolls having a width of 1.25 centimeter.

The seam tape was then used to seam together two pieces of sign face material. The materials used were a sign face product available under the trade designation "PANAFLEX," a Teflon tape 5480 commercially available from 3M Company, and the seaming tape made above. The equipment used was a flat cutting table, a straight edge, a cutting tool, and a Vertrod Thermal Impulse Heat Sealer, commercially available from Vertrod Corporation. The two pieces of sign face material are laid on the table face side down, and aligned so that the internal scrim of the sign face material matches. One piece was overlapped 10–15 cm over the other. A straight edge is laid on top of this overlap and a knife is used to cut through the two pieces of sign material. The small excess pieces were removed and the remaining sign face materials were butted up against each other. One piece of sign material was laid onto the other sign face so that there was an overlap of approximately 0.8 mm. The maximum overlap allowed was 0.16 mm. The seam tape was laid onto this overlap area so that approximately one half of the tape width was on each piece of sign face material. This was secured in place with the Teflon tape. The seam tape region was then placed under the opening of the heat sealer. The conditions used are 150 degrees C. at a pressure of 2.3 Kg in the downward direction, for a dwell time of 45 seconds. The dwell time includes both heating of the material and cooling the sample down to 25 degrees C. The Teflon tape is removed and the seam is completed.

Example 2

Components used included a polyester multifilament woven scrim available under the trade designation "Tetkosilk 14XX," commercially available from Tetko, Inc., a casting liner "AW Liner," commercially available from S. D. Warren Company, and a transparent plastisol "DX 2385," commercially available from Plastomeric, Inc. The procedure used to manufacture the seaming tape and seam the two pieces of sign face material together are exactly the same as described in Example 1.

Example 3

Components used included a polyester multifilament woven scrim available under the trade designation of "Tetkosilk 6XX," commercially available from Tetko, Inc., a casting liner "AW Liner," commercially available from S. D. Warren Company, and a transparent plastisol "DX 2385," commercially available from Plastomeric, Inc. The procedure used to manufacture the seaming tape and seam the two pieces of sign face material together are exactly the same as described in Example 1.

Example 4

Components used included a nonwoven polyester scrim available under the trade designation "Reemay Spunbonded Polyester 2214," commercially available from Reemay, Inc., a casting liner available under the trade designation "AW Liner," commercially available from S. D. Warren Company, and a transparent plastisol was used to coat both sides of this material. The plastisol is available under the trade designation "DX 2385," commercially available from Plastomeric, Inc. The transparent plastisol was coated on the casting liner at a thickness of 0.3 g/sq.cm and gelled in an oven at a temperature of 95 degrees C. The scrim was laminated into this gelled plastisol using a hotcan and pressure. The temperature of the hotcan was 150 degrees C., and the pressure at the nip was 280 KPa. This composite was then cured in an additional oven at a temperature of 180 degrees C. The material was moving continuously, and the composite was exposed for a total of 2.5 minutes at the temperature of 180 degrees C. This "First Pass" material was then stripped from the casting liner and rolled into a separate roll. The transparent plastisol was coated on a casting liner at a thickness of 0.4 g/sq.cm and gelled in an oven at 95 degrees C. The "First Pass" material was laminated to this gelled plastisol using a hotcan and pressure. The temperature of the hotcan was 170 degrees C. The pressure of lamination was 250 KPa. This material was then cured in an oven at 180 degrees C. The material was moving continuously, and the composite was exposed for a total of 2.5 minutes at that temperature. The length of the oven was 30 meters. The material was then stripped from the lasting liner and slit into rolls of 1.25 cm width at some specified length. The procedure used to seam the two pieces of sign face material together was exactly the same as described in Example 1.

Example 5

Components used included a polyester monofilament woven scrim available under trade designation "92T, "commercially available from Tetko, Inc., a casting liner "AW Liner," commercially available from S. D. Warren and a transparent plastisol designated as "DX 2385," commercially available from Plastomeric, Inc. The procedure used to manufacture the seaming tape and seam the two pieces of sign face materials together was exactly the same as described in Example 1.

Example 6

Components used included a polyester multifilament woven scrim available under the trade designation "Tetkosilk 6XX," commercially available from S. D. Warren, and a transparent plastisol "DX 2385," commercially available from Plastomeric, Inc. The procedure used to manufacture the seaming tape and seam the two pieces of sign face material together was exactly the same as that described in Example 4.

Example 7

Components used included a polyester multifilament woven scrim available under the trade designation "Tetkosilk 6XX," commercially available from Tetko, Inc., a casting liner available under the trade designation "AW Liner," commercially available from S. D. Warren Company, and a transparent plastisol available as "DX 2185," commercially available from Plastomeric, Inc. This transparent plastisol was different in formulation from the plastisol used in all other claims of this invention. The procedure used to manufacture the seaming tape and seam the two pieces of sign face materials together was exactly the same as that described in Example 1.

Example 8

Components used included a nonwoven polyester scrim available under the trade designation "Reemay Spunbonded Polyester 2014," commercially available from Reemay, Inc., a casting liner available under the designation "AW Liner," commercially available from S. D. Warren Company, and a transparent plastisol designated "DX 2385," commercially available from Plastomeric, Inc. The procedure used to manufacture the seaming tape and seam the two pieces of sign face material together was exactly the same as that described in Example 1.

Example 9

Components used included a nonwoven polyester scrim available under the trade designation "Reemay Spunbonded Polyester 2214," commercially available from Reemay, Inc., a casting liner designated as "AW Liner," commercially available from S. D. Warren Company, and a transparent plastisol designated as "DX 2385," commercially available from Plastomeric, Inc. The procedure used to manufacture the seaming tape and seam the two pieces of sign face materials together was exactly the same as described in Example 1.

Comparative Example A

Components used included a polyester multifilament woven scrim, commercially available from Milliken, Inc., casting liner available under the designation "AW Liner," commercially available from S. D. Warren Company, and a transparent plastisol available under the trade designation "DX 2385," commercially available from Plastomeric, Inc. This is an example of a material that is currently available in the marketplace today. The plastisol was coated on both sides of the scrim. The transparent plastisol was coated on a casting liner at a thickness of 0.4 g/sq.cm, and then it was cured in an oven at a temperature of 165 degrees C. As this material exited the oven, it was run under a series of IR lights to soften the cured plastisol. The voltage of the lights were set to give a web temperature of 225 degrees C. This material was then laminated to the scrim using a hotcan laminator. The temperature of the hotcan was 180 degrees C. and the pressure at the nip was 700 KPa. This material was then stripped from the liner and put into a separate roll. This material is called "First Pass" material. The "Second Pass" material was produced using the same procedure as that described above for "First Pass" material, except the roll of "First Pass" product was substituted for the scrim. This finished material is stripped from the liner and slit into 1.9 cm rolls of specified length.

In this case, the procedure used to seam two pieces of sign face materials together was significantly different from that described above. Two pieces of sign face was laid onto a flat vacuum table and the two pieces of material were overlapped by 10–15 cm. A rotating knife was used to cut both materials at an angle of 5 degrees. These materials are then positioned to allow for an overlay of 0.3–0.6 cm. These pieces were then taped together to keep them from moving. The seaming tape was then positioned equally on both sides of the sign face material using a guide, and a series of three heat sealers were used to laminate the material together. These heat sealers are a spring-loaded system set to a gap of 0.11 cm. The thickness of the materials prior to using these heat sealers was 0.2 cm. There was a temperature differential of 225/200 degrees C. from the bottom to the top of this heat sealer. This was followed by a set of cooling rolls. The tape was removed, and this completed the seam.

The above seam visibility test and strength test were performed on the above examples, including the Comparative Example A. The results are as follows.

TABLE 1

| EXAMPLE | Density of PANAFLEX | Seam Density | % Trans. PANAFLEX | % Trans. Seam | Seam Strength (lbs.) |
|---|---|---|---|---|---|
| 1 | 0.59 | 0.50 | 25.70 | 31.62 | 56 |
| 2 | 0.60 | 0.64 | 25.12 | 22.91 | 72 |
| 3 | 0.57 | 0.73 | 26.02 | 18.62 | 102 |
| 4 | 0.59 | 0.68 | 25.70 | 20.89 | 92 |
| 5 | 0.60 | 0.58 | 25.12 | 26.30 | 84 |
| 6 | 0.60 | 0.74 | 25.12 | 18.20 | 125 |
| 7 | 0.57 | 0.72 | 26.02 | 19.05 | 110 |
| 8 | 0.58 | 0.71 | 26.30 | 19.50 | 77 |
| 9 | 0.60 | 0.70 | 25.12 | 19.95 | 65 |
| Cntrl A | 0.59 | 1.09 | 25.70 | 8.13 | 122 |

In the case of seam strength, it is well known that a certain minimum strength is required to prevent sign damage when exposed to normal environmental conditions. Generally, a minimum strength of about 50 lbs/linear inch is desired. All examples listed in Table 1 met this minimum, but there is a very large range. Examples 3, 6, and 7 show they are equal or very nearly equal in seam strength to the material currently used in production. However, these examples show the lowest percent transmission of any of the examples. These examples all used the 6XX multifilament woven polyester. In comparing the examples with the best percent transmission, Examples 2, 4, 5, 8, and 9 are very nearly equal to each other. The seam strength of these materials is less than the control, but still exceeds 50 lb. These materials were all made using the nonwoven scrim or a very fine woven scrim. Example 1 is a special case. It had the lowest strength of any example and the seam tape turned very yellow when the seam was produed. In conclusion, any of these examples could be used to produce a minimally visible seam, but seam strength should also be considered.

In view of the foregoing description, it will be apparent that the invention is not limited to the specific details set forth herein for purposes of illustration, and that various other modifications are equivalent for the stated and illustrated functions without departing from the spirit of the invention and the scope thereof as defined in the appended claims.

What is claimed is:

1. A method of joining at least two translucent sign face substrates with a seam tape to form a seam having a transmissive optical density within ±50% of the transmissive optical density of the sign face substrate when the sign face is illuminated from behind the sign face substrate, said method comprising the steps of:

(a) providing at least two sheets of sign face material, such that each sheet comprises a composite of two layers of a thermoplastic material and a scrim layer sandwiched between the two layers of thermoplastic material;

(b) aligning said two sheets such that an edge of each sheet is in an adjoining position and defines an adjoining region without any gaps between the adjoining sheets of sign face material;

(c) positioning a seam tape in said adjoining region such that a portion of said tape simultaneously overlays and contacts each sheet within the adjoining region and extends substantially the length of the adjoining region, said tape comprising a seam scrim substantially embedded in a seam thermoplastic material having an index of refraction similar to the scrim of the seam tape, said seam scrim capable of being substantially wetted out by said seam thermoplastic material;

(d) heating said adjoining region to a temperature which exceeds the melting temperature of said seam thermoplastic material;

(e) exerting sufficient pressure to said heated region to substantially wet out said seam scrim; and (f) allowing said adjoining region to cool.

2. The method of claim 1 wherein said seam thermoplastic material is selected from the group consisting of polyester, polyamide, polypropylene, polyethylene and polyurethane.

3. The method of claim 1 wherein said scrim is a nonwoven, polyester material.

4. The construction of claim 1 wherein said seam has an optical density within about 50% of the surrounding sign face material.

5. The method of claim 1 wherein said two adjoining sheets of sign face material within the adjoining region overlap one another.

6. The method of claim 1 wherein said seam tape has a second layer of a scrim thermoplastic polymer on the opposite side of said seam scrim than said first layer of scrim thermoplastic.

7. The method of claim 1 wherein said seam thermoplastic material is gelled prior to incorporating said seam scrim into said seam thermoplastic material.

* * * * *